310-14 SR

FIP8502 XR 4,480,202

United States Patent [19]

Leutner et al.

[11] Patent Number: 4,480,202

[45] Date of Patent: Oct. 30, 1984

[54] MAGNETIC LINEAR DRIVE

[75] Inventors: Volkmar Leutner, Friolzheim; Hans J. Haase, Stuttgart; Dietmar Meier, Tiefenbronn; Roland Schempp, Vaihingen; Berthold Pfuhl, Markgröningen, all of Fed. Rep. of Germany

[73] Assignee: Robert Bosch GmbH, Stuttgart, Fed. Rep. of Germany

[21] Appl. No.: 471,144

[22] Filed: Mar. 1, 1983

[30] Foreign Application Priority Data

Mar. 5, 1982 [DE] Fed. Rep. of Germany ....... 3207912

[51] Int. Cl.³ ........................................ H02K 41/00

[52] U.S. Cl. ........................................ 310/12; 318/135; 310/14

[58] Field of Search ........................................ 310/12-19, 310/30; 318/135

[56] References Cited

U.S. PATENT DOCUMENTS 3,219,853 11/1965 Schreiber ........................ 310/14

3,433,983 3/1969 Keistman et al. ................. 310/12 X 3,548,273 12/1970 Parodi et al. ...................... 310/14 X

*Primary Examiner*—Donovan F. Duggan

*Attorney, Agent, or Firm*—Michael J. Striker

[57] ABSTRACT

A magnetic linear drive includes an elongated cylindrical armature which is supported for axial displacement in a guiding pipe made of a pressure-resistant material. Two axially spaced solenoid windings are mounted on the guiding pipe and are interconnected by a permanent magnet. The solenoid windings are provided with lateral magnetically conducting cores the ends of which communicate with annular grooves formed in the guiding tube. The grooves are filled with a magnetically conductive material forming the poles of the electromagnet. In the region of the poles, the armature is formed with control flanges of different depths which are acted upon by the magnetic flux to impart the axial movement to the armature. One end of the armature is formed with a measuring flange which cooperates with measuring coils mounted on the guiding pipe.

5 Claims, 2 Drawing Figures

MAGNETIC LINEAR DRIVE

BACKGROUND OF THE INVENTION

The present invention relates in general to magnetic linear drives of the type which include an armature supported for reciprocating movement within a tubular member and activated by means of a solenoid coil radially arranged on the tubular member to induce magnetic flux in the armature. Such magnetic drives are used particularly in connection with sliders of valves.

The disadvantage of prior-art magnetic drives of this kind is the fact that a relatively large current is necessary for energizing the armature and its force acts in a single direction only (proportional magnet).

SUMMARY OF THE INVENTION

It is therefore a general object of the invention to overcome the aforementioned disadvantages.

More particularly, it is an object of the invention to provide an improved magnetic linear drive of the aforedescribed kind which requires substantially less excitation current.

Another object of the invention is to provide such an improved linear drive which has a very high dynamic range.

A further object of the invention is to provide a possibility of controlling the direction of forces in response to the polarity of the input signal in the solenoid coil.

In keeping with these objects and others which will become apparent hereafter, one feature of the invention resides in the provision of a permanent magnet which is arranged on the guiding body for the armature axially with the solenoid coil to induce permanent magnetic flux in the armature.

In the preferred embodiment of this invention, the permanent magnet is coaxially arranged between two solenoid coils.

In another embodiment, the guiding body supports additional coils acting as position sensors for the armature and controlling an electronic control circuit.

In another advantageous embodiment of this invention, the tubular guiding member is provided with annular recesses adjoining respectively the end faces of the energizing coils and being filled with a magnetically conductive substance such as ferrite to form magnetic poles which cooperate with annular flanges formed in the armature.

The armature is further formed with deep annular grooves which are spaced apart by a length corresponding to the length of the energizing coils and of the permanent magnet. The ends of the armature are preferably supported on roller bearings. The entire drive is installed in a housing which supports electrical control circuits for controlling the individual solenoids. Furthermore, the armature is formed with a central bore accommodating an adjustable connection rod.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
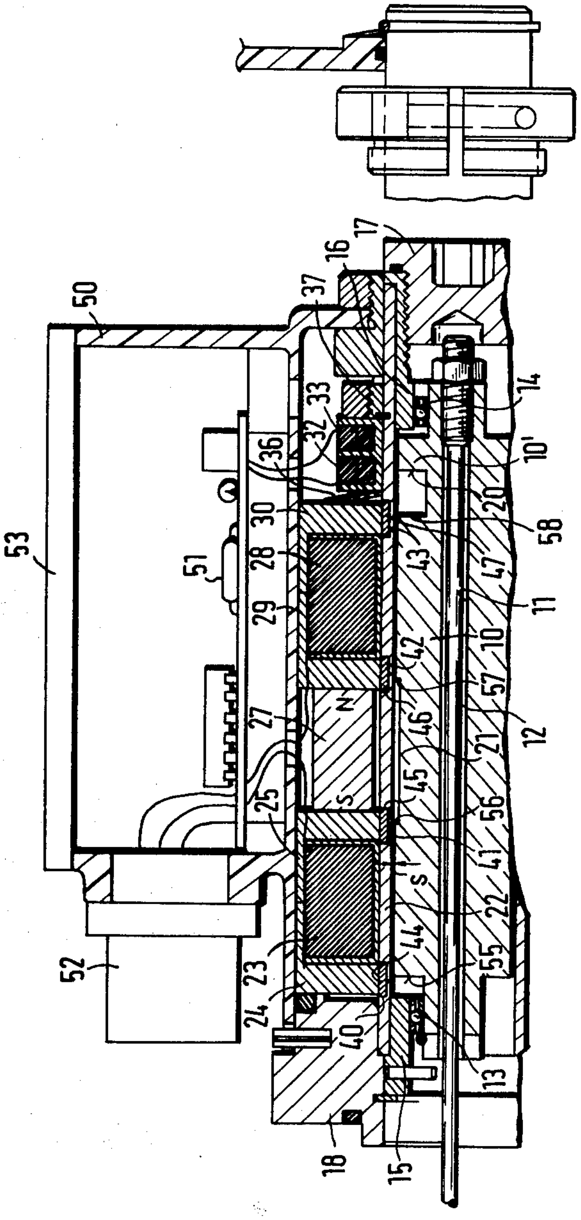
FIG. 1 shows in a sectional side view a cut away part of the magnetic linear drive of this invention.

The magnetic linear drive of this invention includes a hollow cylindrical armature 10 formed with a throughgoing central bore 11 in which a connecting rod is adjustably fastened, for example by means of a screw. The connecting rod 12 serves for example for activating a valve slider and its position relative to the armature 10 is adjustable.

The armature is supported for reciprocating axial movement within a pipe 22 which at one end is secured to a flange 18 and at the other end is provided with a bearing sleeve 16 which is secured thereto by soldering, for example, and is closed by a screw plug 17. The end flange 18 is also connected to a bearing sleeve 15 and both bearing sleeves 15 and 16 are provided with roller bearings 13 and 14, which support for the axial displacement the end portions of the armature 10. The end portions of the armature are reduced in diameter. The intermediate part of the armature is provided with a deep annular groove 20 the bottom part of which corresponds in diameter to the end portion supported in the bearing 14. Another, relatively shallow and wide groove 21 is formed approximately midway between the groove 20 and the end portion supported in the bearing 13. The outer surface of the armature 10 is separated from the inner surface of the tubular member 22 by a narrow air gap s. A solenoid winding 23 with a lateral conductive cores 24 and 25 is mounted on the outer surface of the pipe 22 near the end flange 18. A similar solenoid winding 28 with conductive cores 29 and 30 is mounted on the guiding pipe 22 at a distance from the first solenoid winding 23. The conducting core 25 of the first winding 23, and the conducting core 29 of the second solenoid winding 28, are interconnected by a permanent magnet 27. The spacing between the two solenoid windings 23 and 28 is such that, if the armature 10 is approximately in its illustrated central position in the pipe 22, deep annular steps 55 and 58 at the left end portion and at the deep annular groove 20 respectively are situated approximately at the center of the assigned conductive cores 24 and 30. In the range of the step 10' between the deep grooves 20 and the right end portion of the armature, there are mounted coils 32 and 33 which are substantially smaller than the solenoid windings 23 and 28 and serve together with the deep step 10' on the armature as a position sensor for the latter. The sensing coils 32 and 33 are pressed by means of a leaf spring 36 against an annular abutment 37 screwed on the right-hand end of the guiding pipe 22. The leaf spring 36 rests on the conductive core 30 of the second solenoid winding 28.

The guiding pipe 22 is made preferably of austenitic steel. In order to fulfill the requirement of a high pressure resistance and at the same time to achieve small gap in the magnetic circuit, the wall portions of the pipe 22 opposite respective cores 24, 25, 29 and 30 are formed with annular grooves 40–43 into which rings 44–47 of a ferritic material are inserted and secured by soldering, for example. In this manner the magnetic resistance of the air gap s and of the material of the guiding pipe 22 is decreased.

The guiding pipe 22 also supports an outer housing 50 in which measuring and regulating electronic circuits 51 for controlling the energization of the solenoids 23 and 29 in response to the signals from the measuring coils 32 and 33, is accommodated. The interior of housing 50 is accessible upon removal of a cover plate 53.

The rings 41–47 in the recesses 40–43 in the guiding pipe 22 form magnetic poles of the linear driving system. These poles cooperate through the air gap s with annular edges or steps 55–58 in armature 10 in such a manner as to generate a driving force for the latter. The direction and the magnitude of this force depends on the polarity of the signal applied to the excitation windings 23 and 28 and on the magnitude of these signals. The latter parameters are regulated in response to the position of the armature. For this purpose, the output signals from the position measuring system, that is, from the sensing coils 32 and 33, are compared with a predetermined desired value, the difference is amplified and applied as a regulating signal to the windings 23 and 28 of the driving system.

Figure 2:
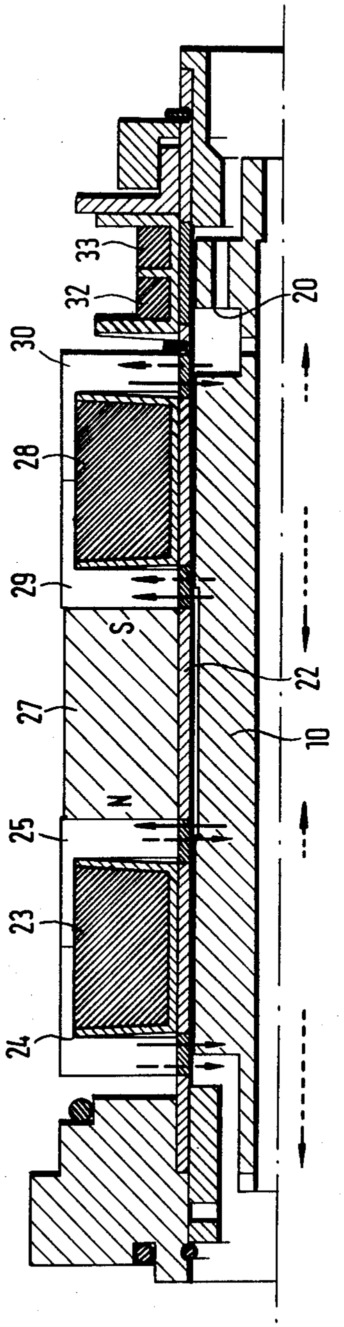
FIG. 2 shows schematically magnetic circuits of the drive of FIG. 1.

FIG. 2 illustrates schematically the magnetic fluxes and forces of the magnetic driving system. Dashed arrows indicate the magnetic flux of the permanent magnet 27, and the full-line arrows indicate the magnetic flux of solenoid coils 23 and 28. If the magnetic flux of the permanent magnet and of the coils flow in the same direction, a large driving force in the armature will result, as indicated by longer horizontally directed dotted-line arrows. If the direction of magnetic fluxes of the permanent magnet of the solenoid windings are opposite, then the resulting driving force acting on the armature is reduced, as indicated by shorter dotted-line arrows.

The novel combination of a permanent magnet and of solenoids requires substantially smaller excitation power in comparison with prior-art drives of this kind, while maintaining a high dynamic quality of the system. A pressure-resistant separation of the armature from the magnetic system, achieved by the pressure pipe 22 provided with magnetically conductive rings 41–47, eliminates pressure sensitivity which hitherto was typical for the electromagnetic drives of this kind. The provision of a position-measuring system in the form of annular coils 32 and 33, which are inserted on the pressure pipe 22, and by forming a measuring core as an integral part of the armature (step 10'), a substantial reduction of manufacturing costs is achieved in comparison with position-measuring systems using a second pressure pipe flanged to the first one and housing a separate movable core.

It will be understood that each of the elements described above, or two or more together, may also find a useful application in other types of constructions differing from the types described above.

While the invention has been illustrated and described as embodied in a magnetic linear drive for use with slider valves, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

We claim:

1. A magnetic linear drive, particularly for use in connection with valve sliders, comprising a tubular pressure-resistant guiding body; an armature arranged for axial displacement within said guiding body; at least two solenoid coils mounted on said guiding body to induce an adjustable magnetic flux in said armature; a permanent magnet arranged on said guiding body in the magnetic circuit of said solenoid coils to induce a permanent magnetic flux in said armature; said two solenoid coils being mounted in an axially spaced relationship and said permanent magnet being arranged between said coils; each of said solenoid coils being provided with lateral conducting members and the outer surface of said tubular guiding body being formed with annular recesses facing the ends of said conducting members, said recesses being filled with a magnetically conductive material forming magnetic poles, and said armature being formed with flanges cooperating with said poles.

2. A magnetic linear drive as defined in claim 1, further comprising a position sensor for said armature, said position sensor including a measuring coil mounted on said guiding body and a flange portion formed in said armature in the range of said measuring coil.

3. A magnetic linear drive as defined in claim 2, wherein the end portions of said armature are reduced diameter and the region of said armature between said measuring coils and the opposite solenoid winding is formed with a deep annular groove delimınting with an end portion a measuring step cooperating with the measuring coils.

4. A magnetic linear drive as defined in claim 3, wherein said end portions are supported for axial displacement in roller bearings installed in said tubular guiding member.

5. A magnetic linear drive as defined in claim 1, wherein said armature is formed with an axial bore accommodating a connecting rod, one end of said connecting rod being adjustably secured to said armature.

* * * * *